US011091161B2

United States Patent
Oh

(10) Patent No.: US 11,091,161 B2
(45) Date of Patent: Aug. 17, 2021

(54) APPARATUS FOR CONTROLLING LANE CHANGE OF AUTONOMOUS VEHICLE AND METHOD THEREOF

(71) Applicants: HYUNDAI MOTOR COMPANY, Seoul (KR); KIA MOTORS CORPORATION, Seoul (KR)

(72) Inventor: Tae Dong Oh, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/852,827

(22) Filed: Apr. 20, 2020

(65) Prior Publication Data

US 2021/0107487 A1 Apr. 15, 2021

(30) Foreign Application Priority Data

Oct. 15, 2019 (KR) .......................... 10-2019-0128051

(51) Int. Cl.
| | |
|---|---|
| B60W 30/18 | (2012.01) |
| B60W 30/095 | (2012.01) |
| B60W 60/00 | (2020.01) |
| B60W 40/04 | (2006.01) |
| G06K 9/00 | (2006.01) |
| G07C 5/08 | (2006.01) |
| G05D 1/02 | (2020.01) |

(52) U.S. Cl.
CPC .. *B60W 30/18163* (2013.01); *B60W 30/0956* (2013.01); *B60W 40/04* (2013.01); *B60W 60/0017* (2020.02); *G05D 1/0221* (2013.01); *G06K 9/00805* (2013.01); *G06K 9/00825* (2013.01); *G07C 5/0816* (2013.01); *B60W 2554/406* (2020.02); *B60W 2554/4029* (2020.02)

(58) Field of Classification Search
CPC .............................................. B60W 30/18163
See application file for complete search history.

(56) References Cited

U.S. PATENT DOCUMENTS

| | | | | |
|---|---|---|---|---|
| 8,352,173 | B2 * | 1/2013 | Greene .................. | G08G 1/166 701/301 |
| 9,796,400 | B2 * | 10/2017 | Puttagunta .............. | B61L 25/04 |
| 2018/0275657 | A1 * | 9/2018 | You ..................... | G05B 23/0294 |
| 2019/0351918 | A1 * | 11/2019 | Maeng ................... | G08G 1/167 |
| 2020/0005144 | A1 * | 1/2020 | Chae .................. | G05B 19/4155 |
| 2020/0257302 | A1 * | 8/2020 | Soltani Bozchalooi ...................... G06N 3/0454 |

* cited by examiner

*Primary Examiner* — Alex C Dunn
(74) *Attorney, Agent, or Firm* — Morgan, Lewis & Bockius LLP

(57) ABSTRACT

An apparatus for controlling a lane change of an autonomous vehicle and a method thereof. The apparatus includes a learning device that performs deep learning by subdividing situation information into groups to be considered when the autonomous vehicle changes a lane, and a controller that controls the lane change of the autonomous vehicle based on a learning result of the learning device.

16 Claims, 17 Drawing Sheets

APPARATUS FOR CONTROLLING LANE CHANGE OF AUTONOMOUS VEHICLE AND METHOD THEREOF

CROSS-REFERENCE TO RELATED APPLICATION

This application claims the benefit of priority to Korean Patent Application No. 10-2019-0128051, filed in the Korean Intellectual Property Office on Oct. 15, 2019, the entire contents of which are incorporated herein by reference.

TECHNICAL FIELD

The present disclosure relates to a technique of determining whether a lane change of an autonomous vehicle is possible (lane change time) based on deep learning.

BACKGROUND

In general, deep learning (or a deep neural network), which is a type of machine learning, may be composed of artificial neural networks (ANNs) of several layers between an input and an output. Such an artificial neural network may include a convolutional neural network (CNN) or a recurrent neural network (RNN) according to a structure, a problem, a purpose to be solved, and the like.

The deep learning is used to solve various problems such as classification, regression, localization, detection, segmentation, and the like. In particular, in an autonomous driving system, semantic segmentation and object detection, which can distinguish the location and type of a dynamic and static obstacle, are important.

The semantic segmentation performs segmentation prediction in units of pixels and dividing the image in units of pixels of identical meaning in order to detect an object in an image, and thus, it is possible to not only identify which object is present in the image but also exactly pinpoint the positions of pixels having the same meaning (the same object).

Object detection means classifying and predicting the type of an object in an image to find location information of the object by regression prediction of a bounding box, and it is possible to understand not only what type of the object is in the image differently from simple classification but also location information of the object.

There has not been proposed a technology of determining whether a lane change of an autonomous vehicle is possible based on such deep learning.

SUMMARY

The present disclosure has been made to solve the above-mentioned problems occurring in the prior art while advantages achieved by the prior art are maintained intact.

An aspect of the present disclosure provides an apparatus for controlling a lane change of an autonomous vehicle and a method thereof which can perform deep learning by subdividing various situation information into groups to be considered for safety at a time of a lane change of the autonomous vehicle, and determine whether the lane change of the autonomous vehicle is possible based on the learned result, thereby drastically reducing accidents that may occur during the lane change of the autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a lane change of an autonomous vehicle includes a learning device that performs deep learning by subdividing situation information into groups to be considered when the autonomous vehicle changes a lane, and a controller that controls the lane change of the autonomous vehicle based on a learning result of the learning device.

The apparatus may further include an input device that inputs group-specific data on the situation information at a current time point.

The controller may determine whether the lane change of the autonomous vehicle is possible by applying the data input through the input device to the learning result of the learning device.

The controller may further consider safety of the autonomous vehicle when determining whether the lane change of the autonomous vehicle is possible. The controller may finally determine that the lane change is impossible when a time to collision (TTC) with a preceding vehicle on a lane to be changed does not exceed a threshold value even when a result derived based on the learning result of the learning device indicates that the lane change of the autonomous vehicle is possible. The threshold value may include a spare time for safe lane change of the autonomous vehicle.

The controller may determine whether the lane change of the autonomous vehicle is possible based on a time-to-collision (TTC) without determining whether the lane change of the autonomous vehicle is possible based on the learning result of the learning device when the autonomous vehicle recognizes a congestion situation or a traffic accident, which occurs on a driving lane in front of the autonomous vehicle, at a point spaced apart by a reference distance.

The input device may include at least one of a first data extractor configured to extract first group data for preventing the autonomous vehicle from colliding with a nearby vehicle when the autonomous vehicle perform the lane change, a second data extractor configured to extract second group data for preventing the autonomous vehicle from colliding with a pedestrian when the autonomous vehicle performs the lane change, a third data extractor configured to extract, as third group data, lighting states of various traffic lights located in front when the autonomous vehicle performs the lane change, a fourth data extractor configured to extract, as fourth group data, a lane changeable area corresponding to a distribution of static objects, a lane changeable area corresponding to a construction section, and a lane changeable area corresponding to an accident section, a fifth data extractor configured to extract a lane changeable area corresponding to a structure of a road as fifth group data, a sixth data extractor configured to extract, as sixth group data, an overlapping area between the lane changeable area extracted by the fourth data extractor and the lane changeable area extracted by the fifth data extractor, and a seventh data extractor configured to extract, as seventh group data, behavior data of the autonomous vehicle when the autonomous vehicle continuously changes lanes, changes lanes in a curvature section, or changes lanes in a state in which a failure code is generated.

According to another aspect of the present disclosure, a method of controlling a lane change of an autonomous vehicle may include performing, by a learning device, deep learning by subdividing situation information into groups to be considered when the autonomous vehicle changes a lane, and controlling, by a controller, the lane change of the autonomous vehicle based on a learning result of the learning device.

The method may further include inputting, by an input device, group-specific data on the situation information at a current time point.

The controlling of the lane change may include determining whether the lane change of the autonomous vehicle is possible by applying the data input through the input device to the learning result of the learning device.

The controlling of the lane change may include further considering safety of the autonomous vehicle when determining whether the lane change of the autonomous vehicle is possible. The controlling of the lane change may include finally determining that the lane change is impossible when a time to collision (TTC) with a preceding vehicle on a lane to be changed does not exceed a threshold value even when a result derived based on the learning result of the learning device indicates that the lane change of the autonomous vehicle is possible. The threshold value may include a spare time for safe lane change of the autonomous vehicle.

The controlling of the lane change may include determining whether the lane change of the autonomous vehicle is possible based on a time-to-collision (TTC) without determining whether the lane change of the autonomous vehicle is possible based on the learning result of the learning device when the autonomous vehicle recognizes a congestion situation or a traffic accident, which occurs on a driving lane in front of the autonomous vehicle, at a point spaced apart by a reference distance.

The inputting of the group-specific data may include extracting first group data for preventing the autonomous vehicle from colliding with a nearby vehicle when the autonomous vehicle perform the lane change, extracting second group data for preventing the autonomous vehicle from colliding with a pedestrian when the autonomous vehicle performs the lane change, extracting, as third group data, lighting states of various traffic lights located in front when the autonomous vehicle performs the lane change, extracting, as fourth group data, a lane changeable area corresponding to a distribution of static objects, a lane changeable area corresponding to a construction section, and a lane changeable area corresponding to an accident section, extracting a lane changeable area corresponding to a structure of a road as fifth group data, extracting, as sixth group data, an overlapping area between the lane changeable area of the fourth group data and the lane changeable area of the fifth group data, and extracting, as seventh group data, behavior data of the autonomous vehicle when the autonomous vehicle continuously changes lanes, changes lanes in a curvature section, or changes lanes in a state in which a failure code is generated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. It should be noted that the identical or equivalent component is designated by the identical numeral even when they are displayed on different drawings. Further, in describing exemplary embodiments of the present disclosure, a detailed description of well-known features or functions will be ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In one embodiment of the disclosure information is used as the concept that includes data.

Figure 1:
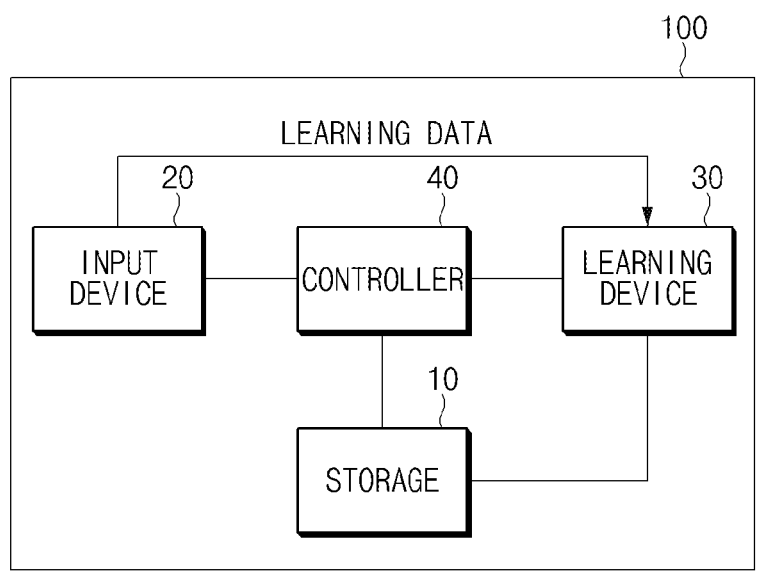
FIG. 1 is a block diagram illustrating a lane change control apparatus of an autonomous vehicle according to an embodiment of the present disclosure.

FIG. 1 is a block diagram illustrating a lane change control apparatus of an autonomous vehicle according to an embodiment of the present disclosure.

As shown in FIG. 1, a lane change control apparatus 100 for an autonomous vehicle according to an embodiment of the present disclosure may include storage 10, an input device 20, a learning device 30, and a controller 40. In this case, according to a method of implementing the lane change control apparatus 100 of an autonomous vehicle according to an embodiment of the present disclosure, components may be combined with each other and implemented as one, or some components may be omitted. In particular, the learning device 30 may be implemented to be included in the controller 40 as one function block of the controller 40.

Looking at the respective components, first, the storage 10 may include various logics, algorithms, and programs required in the operations of performing deep learning by subdividing various situation information into groups to be considered for safety at a time of a lane change of an autonomous vehicle and determining whether the lane change of the autonomous vehicle is possible based on the learning result.

The storage 10 may store the learning result (e.g., a learning model for safe lane change) by the learning device 30.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

Next, the input device 20 may input (provide) to the learning device 30 the data (learning data) required in the operation of learning a safe lane change.

In addition, the input device 20 may perform a function of inputting, to the controller 40, data of the current time point required in the operation of determining whether the lane change of the autonomous vehicle is possible.

Next, the learning device 30 learns the learning data input through the input device 20 based on deep learning. In this case, the learning data has a form in which various situation information to be considered for safety during the lane change of the autonomous vehicle is subdivided into groups.

The learning device 30 may perform learning in various ways. For example, the learning device may perform simulation-based learning in the early stage of no learning at all, cloud server-based learning in the middle in which learning is conducted to some extent, and additional learning based on the lane change propensity of an individual after the learning is completed. In this case, a cloud server collects various situation information from a plurality of vehicles performing lane change and infrastructure, and provides the collected situation information to autonomous vehicles as learning data.

Next, the controller 40 performs the overall control such that each component can perform its function. The controller 40 may be implemented in the form of hardware or software, or may be implemented in the form of a combination of hardware and software. Preferably, the controller 40 may be implemented with a microprocessor, but is not limited thereto.

In particular, the controller 40 may perform deep learning by subdividing the various situation information into groups to be considered for safety at a time of the lane change of the autonomous vehicle, and perform various controls required in the operation of determining whether the lane change of the autonomous vehicle is possible based on the learning result.

The controller 40 may determine whether the lane change of the autonomous vehicle is possible by applying data on the surrounding situation of the current time point input through the input device 20 to the learning result of the learning device 30.

For example, when a lane change path of the autonomous vehicle overlaps with the driving trajectory of a nearby vehicle or is within a specified distance, the controller 40 may determine that the lane change of the autonomous vehicle is impossible.

As another example, when the lane change of the autonomous vehicle violates the law (lane change over the solid line on the road), the controller 40 may determine that the lane change of the autonomous vehicle is impossible.

The controller 40 may determine whether the lane change of the autonomous vehicle is possible further in consideration of the safety of the autonomous vehicle when determining whether the lane change of the autonomous vehicle is possible. That is, even if the result of applying the data on the surrounding situation at the current time point, which are input through the input device 20, to the learning result of the learning device 30 indicates that the lane change of the autonomous vehicle is possible, the controller 40 may finally determine whether the lane change of the autonomous vehicle is possible by determining whether the lane change of the autonomous vehicle is safe. In this case, the safe lane change refers to a state (high safety) in which lane change is possible with ease. For reference, the lane changeable state determined based on the learning result usually indicates a state in which lane change is possible tightly.

For example, even though the result derived based on the learning result of the learning device 30 indicates that the lane change of the autonomous vehicle is possible, the controller 40 may finally determine the lane change is impossible when the time to collision (TTC) with the preceding vehicle on the lane does not exceed the threshold value. In this case, the threshold may further include a spare time for the safe lane change.

The controller 40 may determine whether the lane change of the autonomous vehicle is possible based on the TTC without determining whether the lane change of the autonomous vehicle is possible based on the learning result of the learning device 30 in a special situation (meeting a reference condition).

For example, when traffic congestion or a traffic accident occurring in front of a driving lane of the autonomous vehicle is recognized in a long distance (e.g., 1 km or more), the controller 40 may determine whether the lane change of the autonomous vehicle is possible based on the TTC before determining whether the lane change of the autonomous vehicle is possible based on the learning result of the learning device 30 in a section in which a lane change is required. In this case, when the amount of traffic around the autonomous vehicle is large, the operation of determining whether the lane change of the autonomous vehicle is possible based on the above-described TTC may not be performed.

Figure 2:
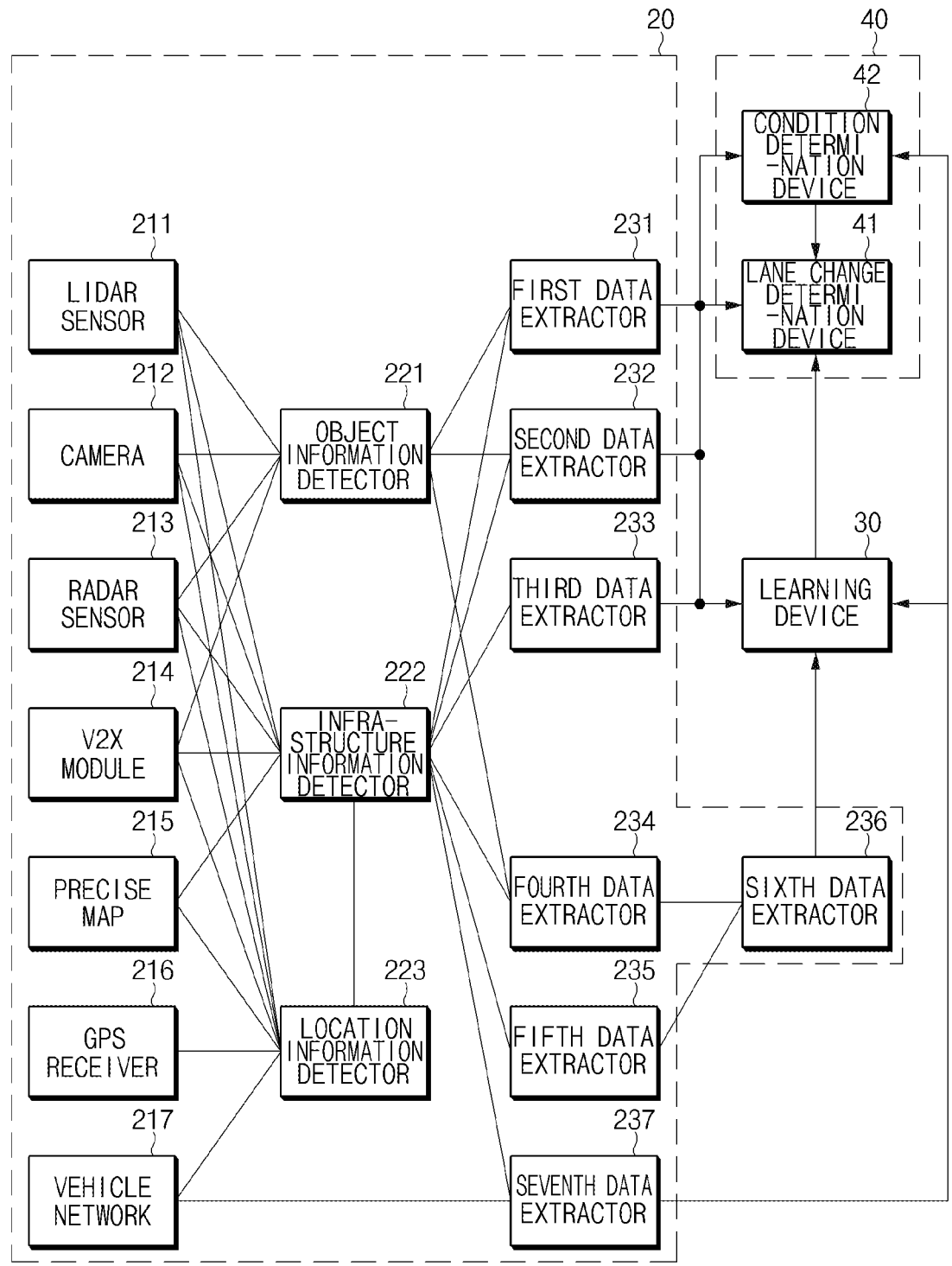
FIG. 2 is a detailed configuration diagram of a lane change control apparatus of an autonomous vehicle according to an embodiment of the present disclosure.

FIG. 2 is a detailed configuration diagram of a lane change control apparatus of an autonomous vehicle according to an embodiment of the present disclosure.

As shown in FIG. 2, the input device 20 may include a light detection and ranging (LiDAR) sensor 211, a camera 212, a radio detecting and ranging (Radar) sensor 213, a V2X module 214, a precise map 215, a global positioning system (GPS) receiver 216, and a vehicle network 217.

The LiDAR sensor 211, which is a kind of environmental awareness sensor, is mounted on the autonomous vehicle and measures the location coordinates and the like of a reflector based on the time taken to return thereto after shooting a laser beam in all directions while being rotated.

The camera 212 is mounted to the rear of an interior room mirror of the autonomous vehicle to take an image including a lane, a vehicle, a person and the like located around the autonomous vehicle.

The radar sensor 213 receives the electromagnetic wave reflected from an object after shooting an electromagnetic wave to measure the distance to the object, the direction of the object, and the like. The radar sensor 213 may be mounted on the front bumper and the rear side of the autonomous vehicle, recognize a long distance object, and be hardly affected by weather.

The V2X module 214 may include a vehicle-to-vehicle (V2V) module and a vehicle-to-infrastructure (V2I) module. The V2V module may communicate with a nearby vehicle to obtain the location, speed, acceleration, yaw rate, traveling direction, and the like of another nearby vehicle. The V2I module may obtain information about the shape of a road, surrounding structures, traffic lights (e.g., a location, and a lighting state (red, yellow, green, and the like)), and the like from an infrastructure.

The precise map 215, which is a map for autonomous driving, may include information about lanes, traffic lights, signs, and the like for accurate location measurement of the autonomous vehicle and safety enhancement of autonomous driving.

The GPS receiver 216 receives GPS signals from three or more GPS satellites.

The vehicle network 217, which is a network for communication between controllers in an autonomous vehicle, may include a controller area network (CAN), a local interconnect network (LIN), a FlexRay, a media oriented systems transport (MOST), an Ethernet, and the like.

In addition, the input device 20 may include an object information detector 221, an infrastructure information detector 222, and a location information detector 223.

The object information detector 221 detects object information around the autonomous vehicle based on the Lidar sensor 211, the camera 212, the radar sensor 213, and the V2X module 214. In this case, the object may include a vehicle, a person, and an object located on a road, and the object information may include a speed, an acceleration, a yaw rate, yaw rate, a cumulative value of longitudinal acceleration over time, and the like as information about an object.

The infrastructure information detector 222 detects the infrastructure information around the autonomous vehicle based on the Lidar sensor 211, the camera 212, the radar sensor 213, the V2X module 214, and the precise map 215. In this case, the infrastructure information includes a shape of a road (lanes, a central divider, and the like), a surrounding structure, a traffic light state, a crosswalk outline, a road boundary, and the like.

The location information detector 223 detects the location information of the autonomous vehicle based on the Lidar sensor 211, the camera 212, the radar sensor 213, the V2X module 214, the precise map 215, the GPS receiver 216, and the vehicle network 217. In this case, the location information may include reliability information indicating the accuracy of the location information detection.

In addition, the input device 20 may include a first data extractor 231, a second data extractor 232, a third data extractor 233, a fourth data extractor 234, a fifth data extractor 235, a sixth data extractor 236, and a seventh data extractor 237.

Hereinafter, a process of subdividing various situation information into groups to be considered for safety at a time of a lane change of an autonomous driving vehicle will be described with reference to FIGS. 3 to 10.

Figure 3A:
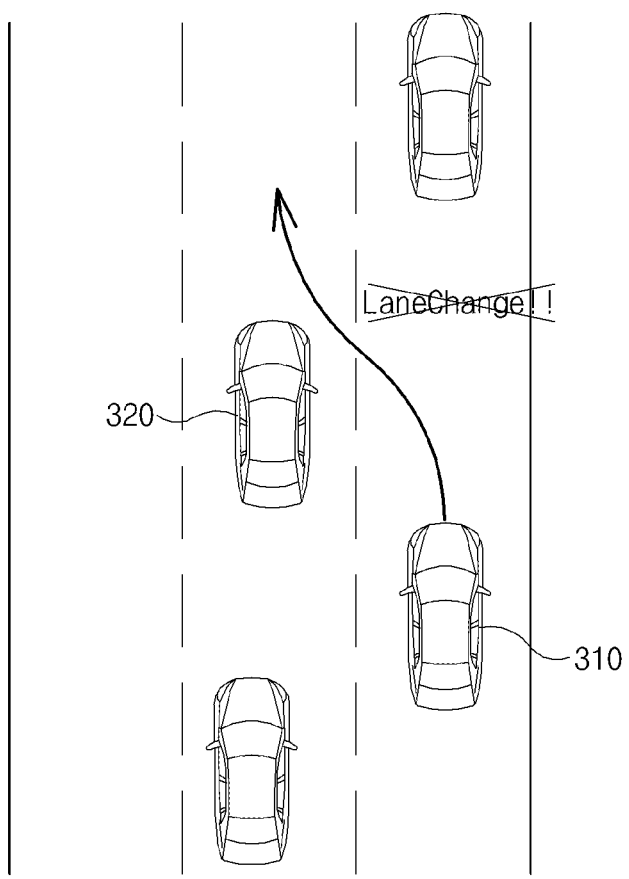
FIGS. 3A to 3C are views illustrating a situation in which the first data extractor included in a lane change control apparatus of an autonomous vehicle according to an embodiment of the present disclosure extracts the first group data.
Figure 3B:
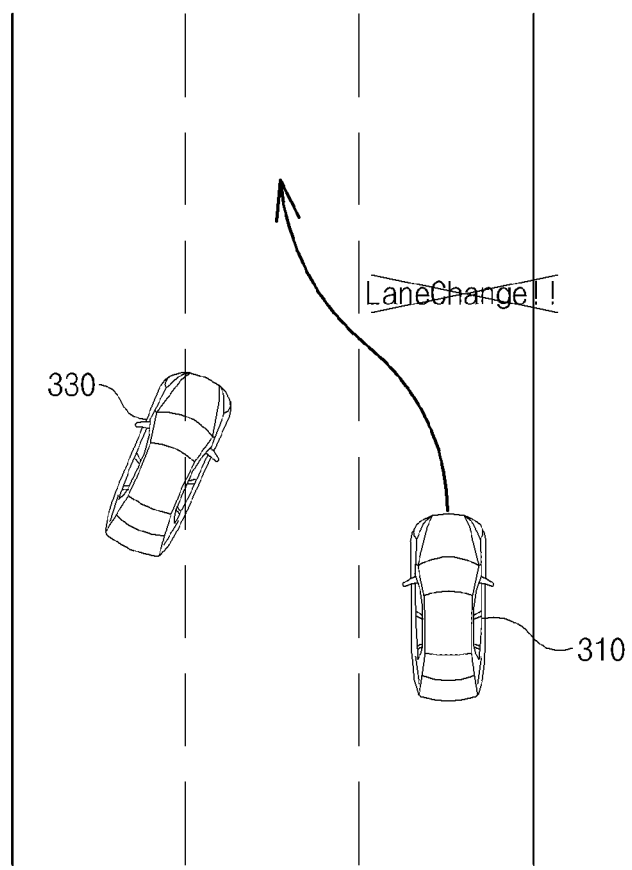
Figure 3C:
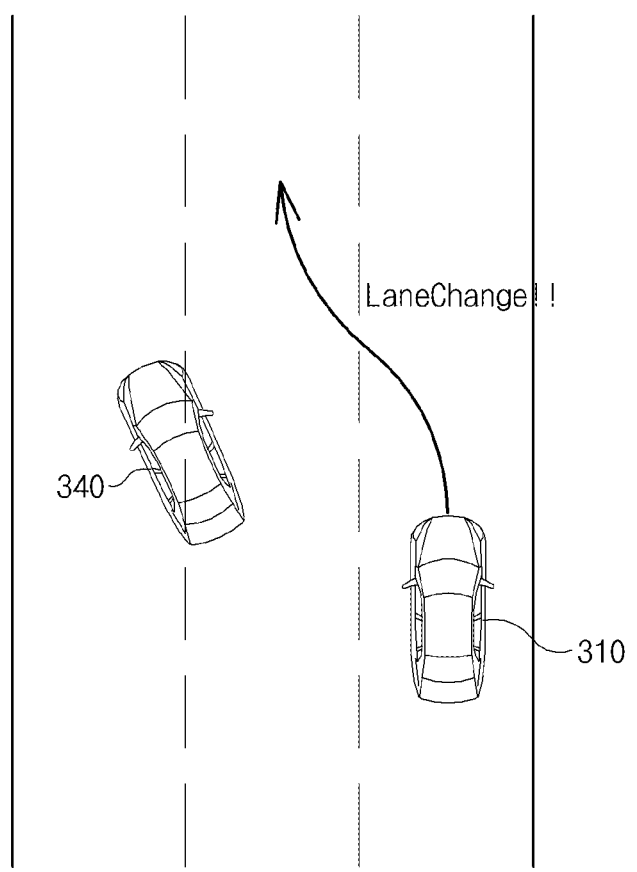

FIGS. 3A to 3C are views illustrating a situation in which the first data extractor included in a lane change control apparatus of an autonomous vehicle according to an embodiment of the present disclosure extracts the first group data.

As shown in FIGS. 3A to 3C, the first data extractor 231 may extract the first group data for preventing a collision with surrounding vehicles 320, 330 and 340 at the time of the lane change of an autonomous vehicle 310 from the object information and the infrastructure information. In this case, the first group data may include the locations, speeds, accelerations, yaw rates, traveling directions, and the like of the surrounding vehicles 320, 330 and 340.

FIG. 3A illustrates a case in which a collision with the surrounding vehicle 320 driving on a target lane occurs when the autonomous vehicle 310 changes lanes. FIG. 3B illustrates a case in which a collision with the surrounding vehicle 330 entering the target lane occurs when the autonomous vehicle 310 changes lanes. FIG. 3C illustrates a case in which a drastic lane change is possible due to the departure of the surrounding vehicle 340 from the target lane when the autonomous vehicle 310 changes lanes.

Figure 4:
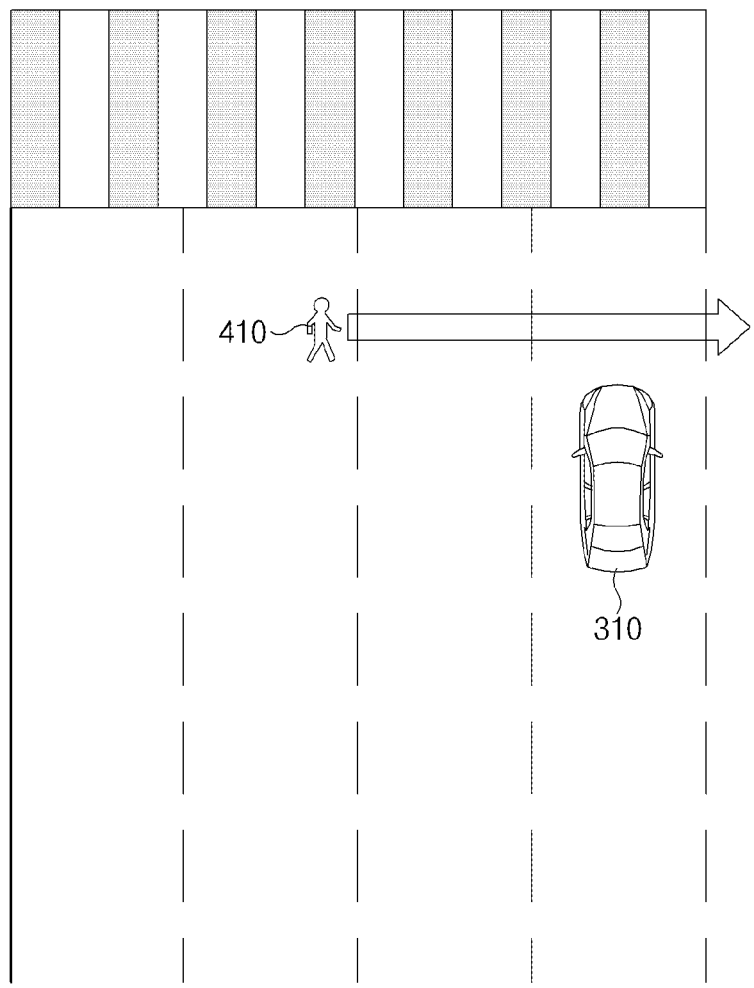
FIG. 4 is a view illustrating a situation in which the second data extractor provided in the lane change control apparatus of the autonomous vehicle according to an embodiment of the present disclosure extracts the second group data.

FIG. 4 is a view illustrating a situation in which the second data extractor provided in the lane change control apparatus of the autonomous vehicle according to an embodiment of the present disclosure extracts the second group data.

As shown in FIG. 4, the second data extractor 232 may extract the second group data for preventing collision with a pedestrian 410 when the autonomous vehicle 310 changes lanes from object information and infrastructure information. In this case, the second group data may include the location, speed and traveling direction of the pedestrian 410, a precise map around the pedestrian 410, and the like.

Figure 5:
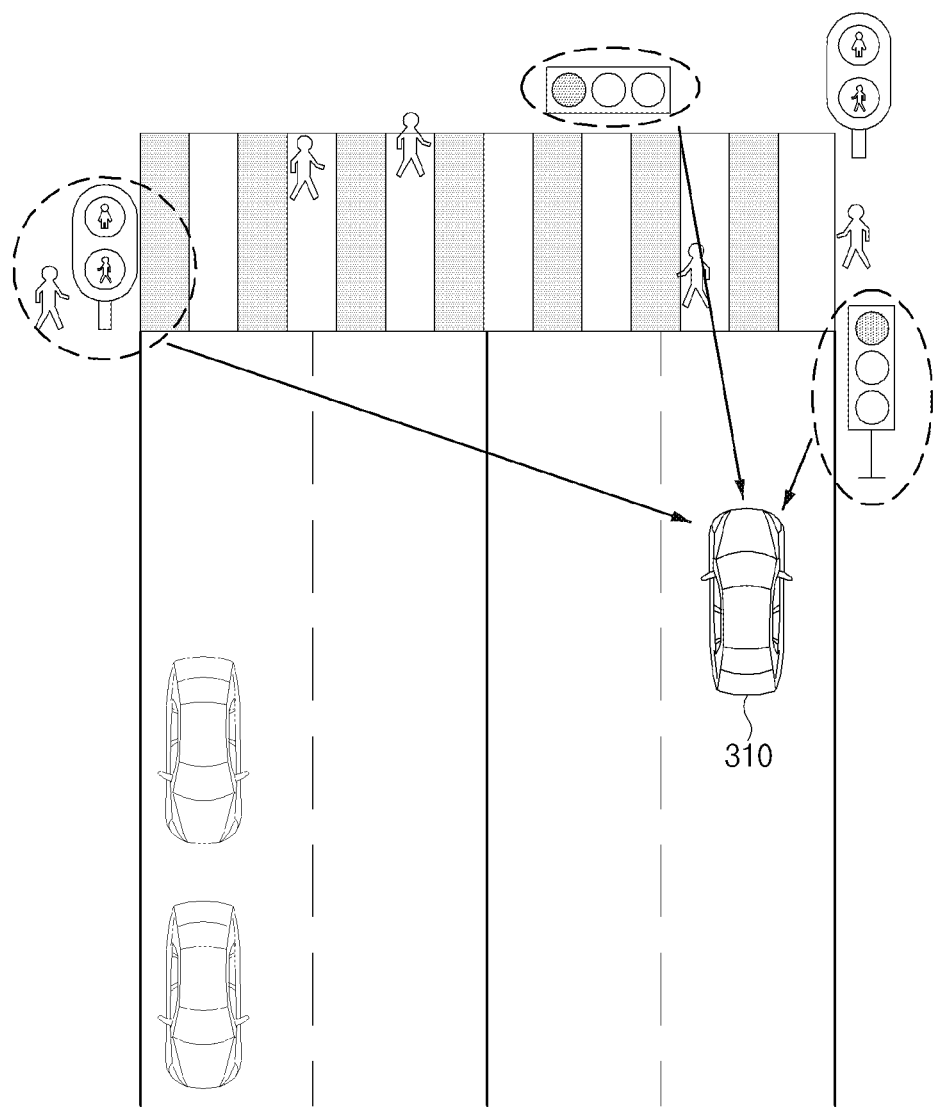
FIG. 5 is a view illustrating a situation in which the third data extractor provided in the lane change control apparatus of the autonomous vehicle according to an embodiment of the present disclosure extracts the third group data.

FIG. 5 is a view illustrating a situation in which the third data extractor provided in the lane change control apparatus of the autonomous vehicle according to an embodiment of the present disclosure extracts the third group data.

As shown in FIG. 5, the third data extractor 233 obtains a lighting state of each traffic light located around the autonomous vehicle 310 based on the infrastructure information, and extracts, as the third group data, the lighting state of the traffic light related to the lane change of the autonomous vehicle 310 from the obtained lighting states of traffic lights. In this case, the traffic light may include a vehicle traffic light and a pedestrian traffic light associated with the lane change of the autonomous vehicle 310 at an intersection.

Figure 6A:
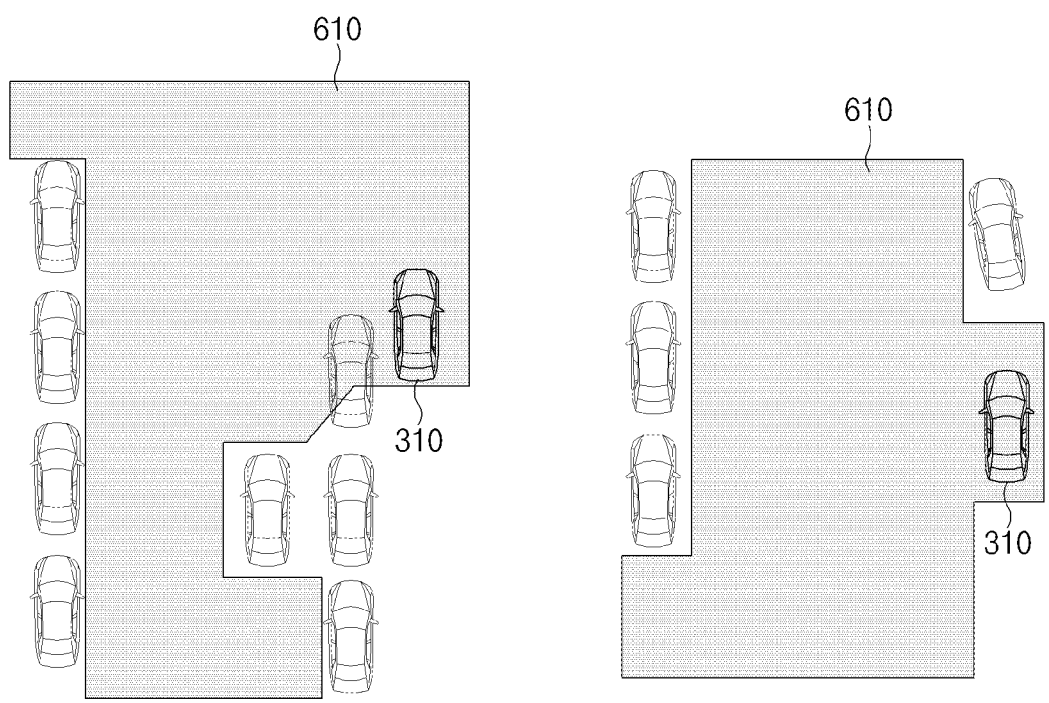
FIGS. 6A and 6B are views illustrating a situation in which the fourth data extractor provided in the lane change control apparatus of the autonomous vehicle according to an embodiment of the present disclosure extracts the fourth group data.
Figure 6B:
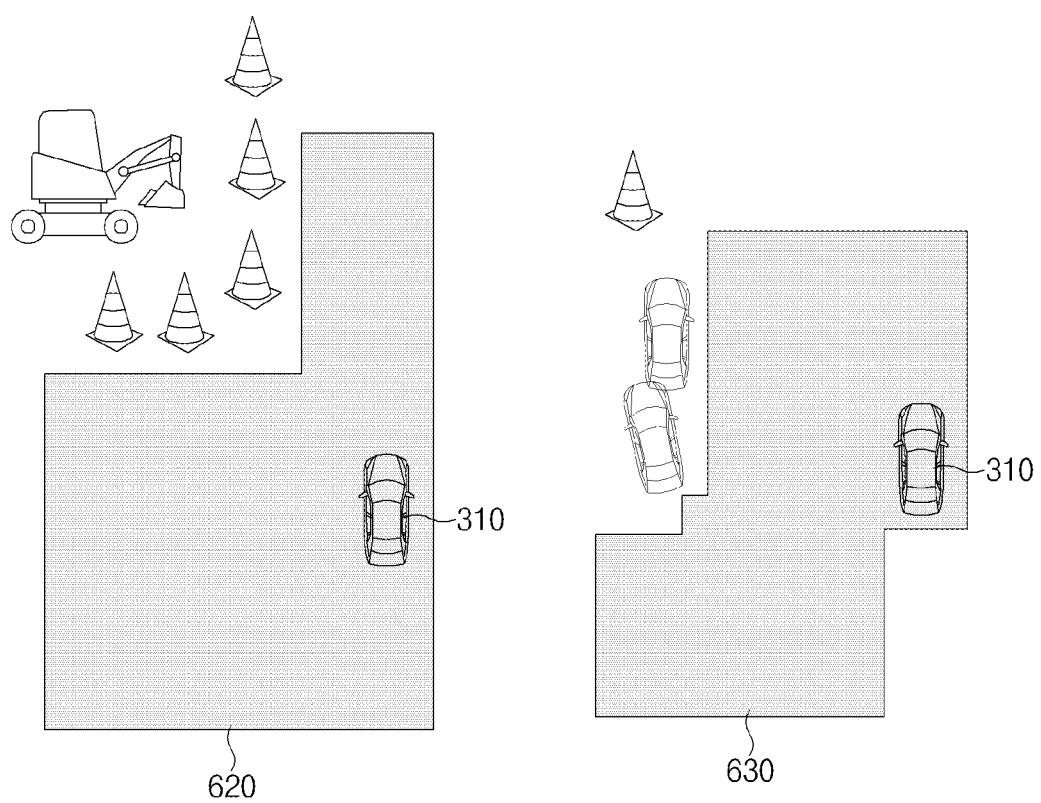

FIGS. 6A and 6B are views illustrating a situation in which the fourth data extractor provided in the lane change control apparatus of the autonomous vehicle according to an embodiment of the present disclosure extracts the fourth group data.

As shown in FIG. 6A, the fourth data extractor 234 may extract, as the fourth group data, a lane changeable area 610 corresponding to the distribution of static objects (e.g., parked vehicles) based on the object information and the infrastructure information.

As shown in FIG. 6B, the fourth data extractor 234 may further extract, as the fourth group data, a lane changeable area 620 corresponding to a construction section and a lane changeable area 630 corresponding to an accident section based on the object information and the infrastructure information.

Figure 7A:
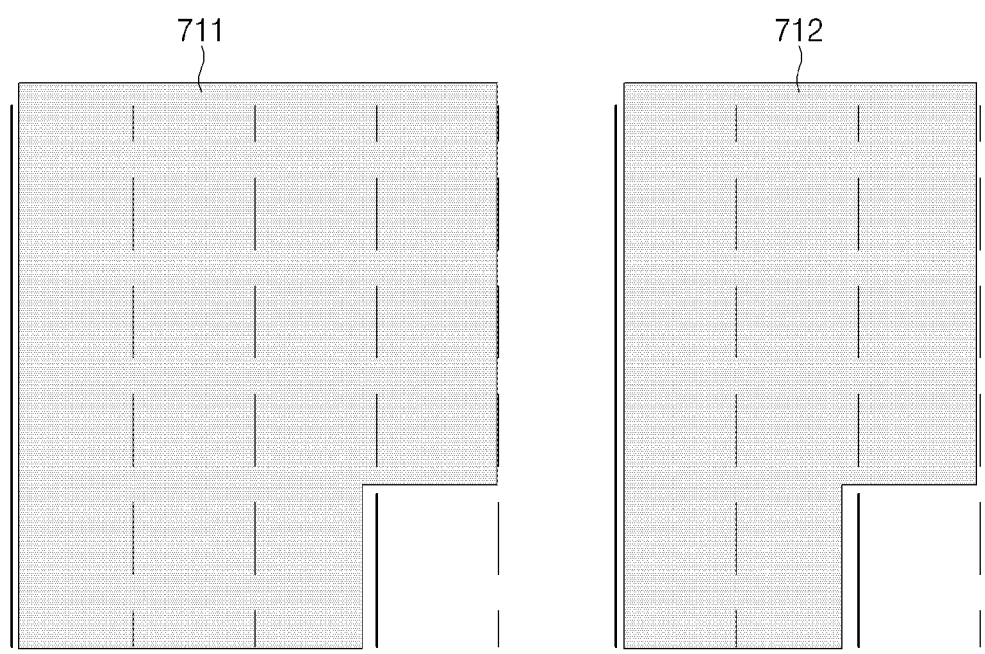
FIGS. 7A and 7B are views illustrating a situation in which the fifth data extractor provided in the lane change control apparatus of the autonomous vehicle according to an embodiment of the present disclosure extracts the fifth group data.
Figure 7B:
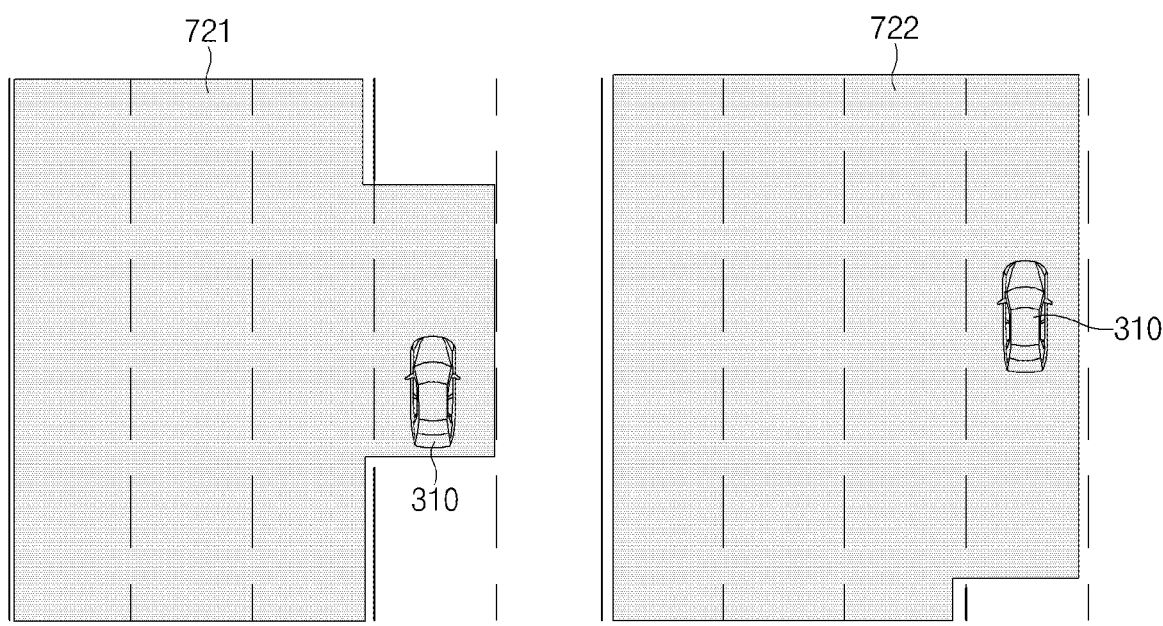

FIGS. 7A and 7B are views illustrating a situation in which the fifth data extractor provided in the lane change control apparatus of the autonomous vehicle according to an embodiment of the present disclosure extracts the fifth group data.

The fifth data extractor 235 may extract a lane changeable area corresponding to the structure of a road based on the infrastructure information as the fifth group data.

As shown in FIG. 7A, the fifth data extractor 235 may extract lane changeable areas 711 and 712 from an image photographed by the camera 212.

As shown in FIG. 7B, the fifth data extractor 235 may extract lane changeable areas 721 and 722 based on the location of the autonomous vehicle 310 on the precise map 215.

Figure 8:
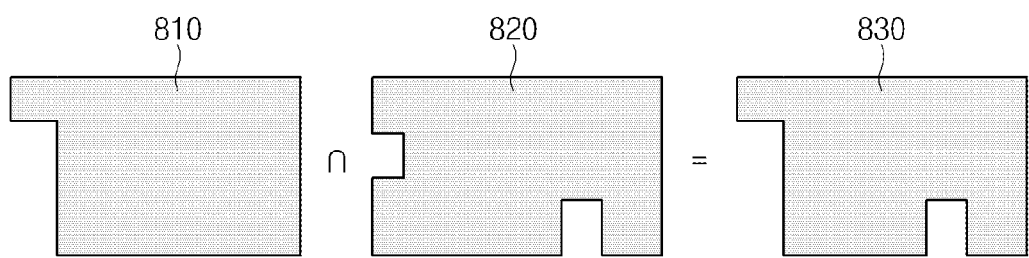
FIG. 8 is a view illustrating a final lane changeable area extracted by a sixth data extractor included in a lane change control apparatus of an autonomous vehicle according to an embodiment of the present disclosure as the sixth group data.

FIG. 8 is a view illustrating a final lane changeable area extracted by a sixth data extractor included in a lane change control apparatus of an autonomous vehicle according to an embodiment of the present disclosure as the sixth group data.

As shown in FIG. 8, the sixth data extractor 236 may extract an overlap area (a final lane changeable area) 830 between a lane changeable area 810 extracted by the fourth data extractor 234 and a lane changeable area 820 extracted by the fifth data extractor 235 as the sixth group data.

Figure 9A:
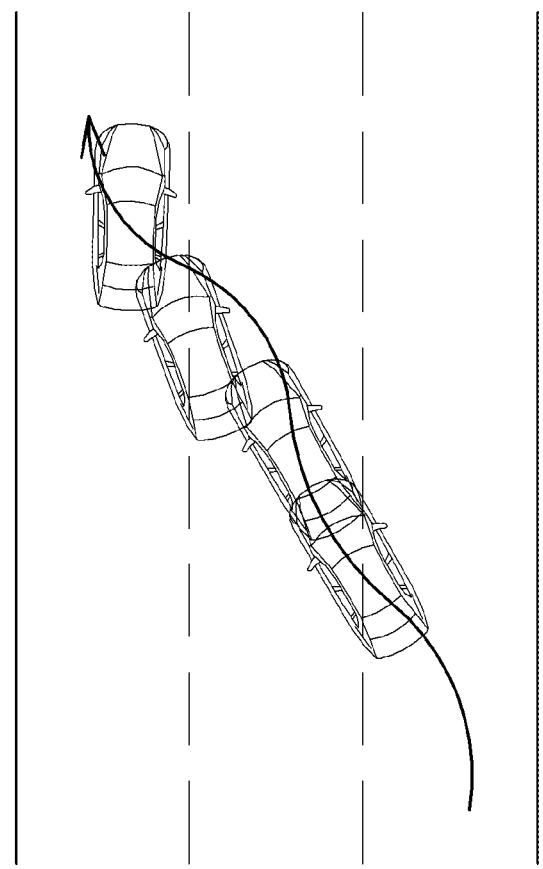
FIGS. 9A to 9C are views illustrating a situation in which the seventh data extractor included in a lane change control apparatus of an autonomous vehicle according to an embodiment of the present disclosure extracts the seventh group data.
Figure 9B:
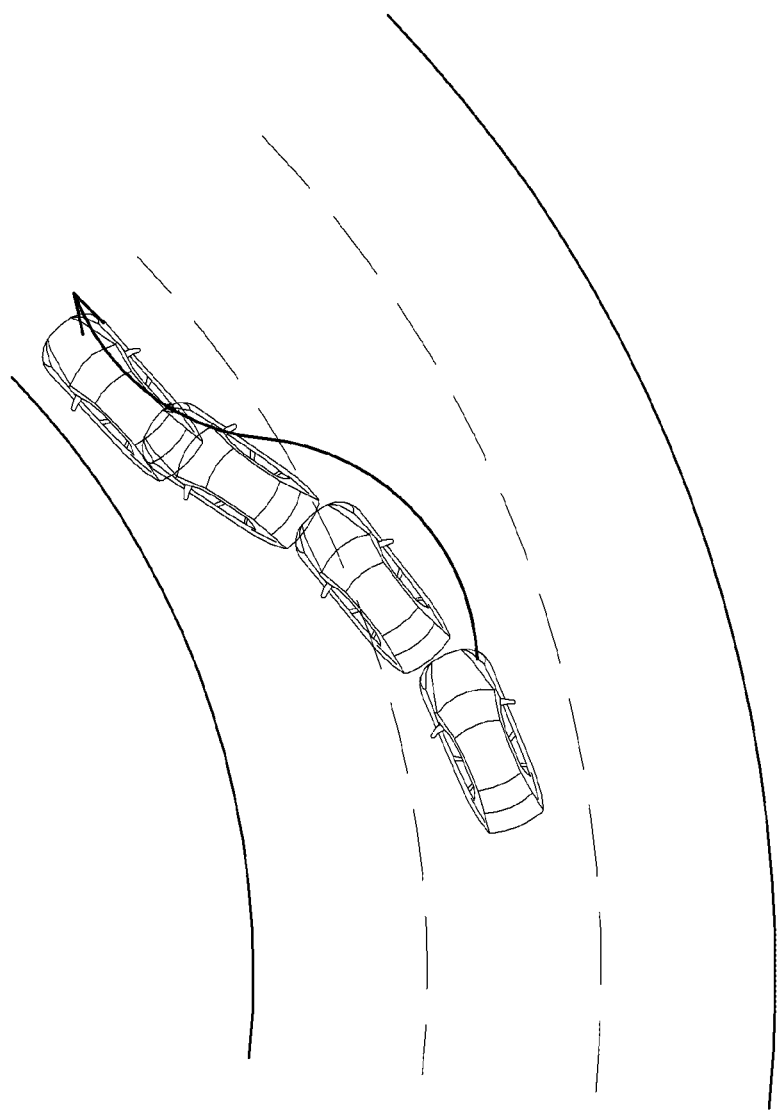
Figure 9C:
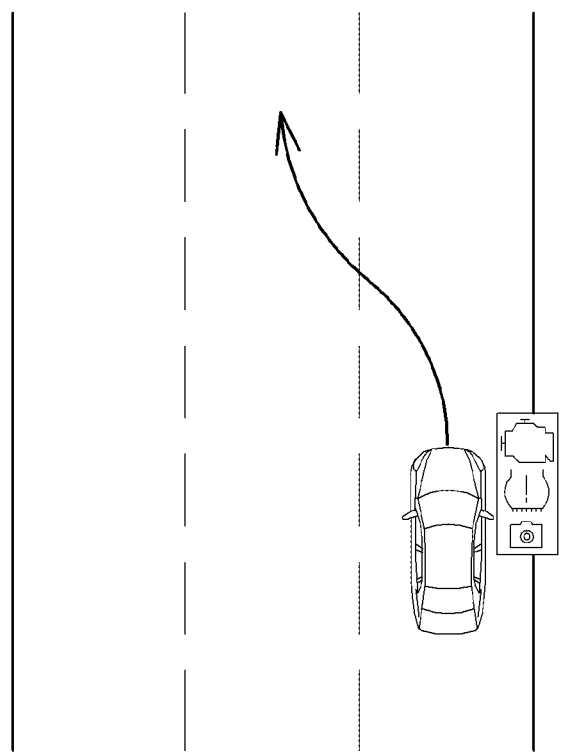

FIGS. 9A to 9C are views illustrating a situation in which the seventh data extractor included in a lane change control apparatus of an autonomous vehicle according to an embodiment of the present disclosure extracts the seventh group data.

The seventh data extractor 237 extracts behavior data of the autonomous vehicle, such as a speed, an acceleration, a driving direction, a steering wheel angle, a yaw rate, a trouble code, and the like, through the infrastructure information and the vehicle network 217 as the seventh group data.

As shown in FIG. 9A, when the autonomous vehicle tries to change lanes again after performing the lane change, the seventh data extractor 237 may extract the behavior data of the autonomous vehicle.

As shown in FIG. 9B, when the autonomous vehicle performs the lane change in a curvature section, the seventh data extractor 237 may extract the behavior data of the autonomous vehicle.

As shown in FIG. 9C, when the autonomous vehicle changes lanes in a state where a trouble code is generated in the autonomous vehicle, the seventh data extractor 237 may extract the behavior data of the autonomous vehicle. In this case, the trouble code refers to a code indicating trouble occurring in various sensors, a controller, a motor driven power steering (MDPS), and the like.

The learning device 30 learns a lane changeable situation of the autonomous vehicle by using data extracted by the first to third data extractors 231 to 233 and the sixth and seventh data extractors 236 and 237 based on the deep learning. The learning result of the learning device 30 may be used for a lane change determination device 41 to determine whether the lane change of the autonomous vehicle is possible.

The learning device 30 may further learn by receiving avoiding lane information when an abnormal situation (construction, accident, rock fall, pedestrian) occurs in front of the driving lane of the autonomous vehicle. In this case, an embodiment of the present disclosure may further include an eighth data extractor (not shown), which extracts the avoiding lane information based on object information and infrastructure information.

The learning device 30 may use at least one of artificial neural networks such as a convolutional neural network (CNN), a recurrent neural network (RNN), a restricted Boltzmann machine (RBM), a deep belief network (DBN), a deep Q-network, a generative adversarial network (GAN), and a softmax. In this case, at least 10 hidden layers of the artificial neural network, and 500 or more hidden nodes in the hidden layer are preferable, but are not limited thereto.

The controller 40 may include the lane change determination device 41 and a condition determination device 42 which are functional blocks.

The lane change determination device 41 may determine whether the lane change of the autonomous vehicle is possible by applying the data extracted by the first to third data extractors 231 to 233 and the sixth and seventh data extractors 236 and 237 to the learning result of the learning device 30.

For example, the lane change determination device 41 may determine that the lane change of the autonomous vehicle is impossible when the lane change path of the autonomous vehicle overlaps with the driving trajectory of a nearby vehicle or is within a specified distance.

As another example, the lane change determination device 41 may determine that the lane change of the autonomous vehicle is impossible when the autonomous vehicle has to violate the law (lane change beyond the solid line on the road) when changing lanes.

The lane change determination device 41 may determine whether the lane change of the autonomous vehicle is possible further in consideration of the determination result of the condition determination device 42. That is, even when the lane change determination device 41 primarily determines that the lane change of the autonomous vehicle is possible, if the determination result of the condition determination device 42 indicates that lane change is impossible, it may finally be determined that the lane change of the autonomous vehicle is impossible.

The condition determination device 42 may determine whether the lane change of the autonomous vehicle is possible further in consideration of the safety of the autonomous vehicle based on the data extracted by the first to third data extractors 231 to 233 and the sixth and seventh data extractors 236 and 237.

For example, even if the result derived based on the learning result of the learning device 30 indicates that the lane change of the autonomous vehicle is possible, the condition determination device 42 may finally determine that the lane change of the autonomous vehicle is impossible when the time to collision (TTC) with the preceding vehicle on the lane to be changed does not exceed the threshold value. In this case, the TTC may further include a spare time for a safe lane change.

The condition determination device 42 may determine whether the lane change of the autonomous vehicle is possible based on the above-described TTC without determining whether the lane change of the autonomous vehicle is possible based on the learning result of the learning device 30 in a special situation.

For example, when the autonomous vehicle is aware of a congestion situation or a traffic accident occurring in front of a driving lane in a long distance (e.g., 1 km or more), the condition determination device 42 may determine in advance whether the lane change of the autonomous vehicle is possible based on the above-described TTC before determining whether the lane change of the autonomous vehicle is possible based on the learning result of the learning device 30 in a section to change lanes. In this case, when the amount of traffic around the autonomous vehicle is large, the process of determining whether the lane change of the autonomous vehicle is possible based on the above-described TTC may not be performed.

Figure 10:
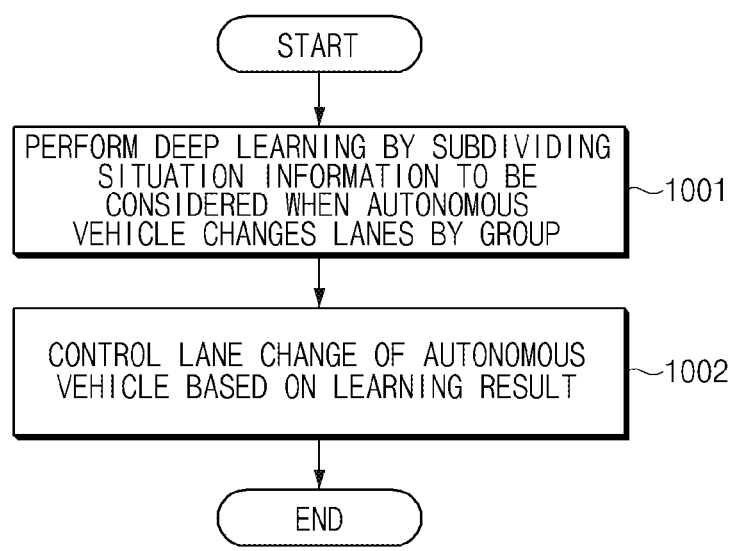
FIG. 10 is a flowchart illustrating a lane change control method of an autonomous vehicle according to an embodiment of the present disclosure.

FIG. 10 is a flowchart illustrating a lane change control method of an autonomous vehicle according to an embodiment of the present disclosure.

First, in operation 1001, the learning device 30 performs deep learning by subdividing the situation information into groups to be considered in the lane change of the autonomous vehicle.

Then, in operation 1002, the controller 40 controls the lane change of the autonomous vehicle based on the learning result of the learning device 30.

Figure 11:
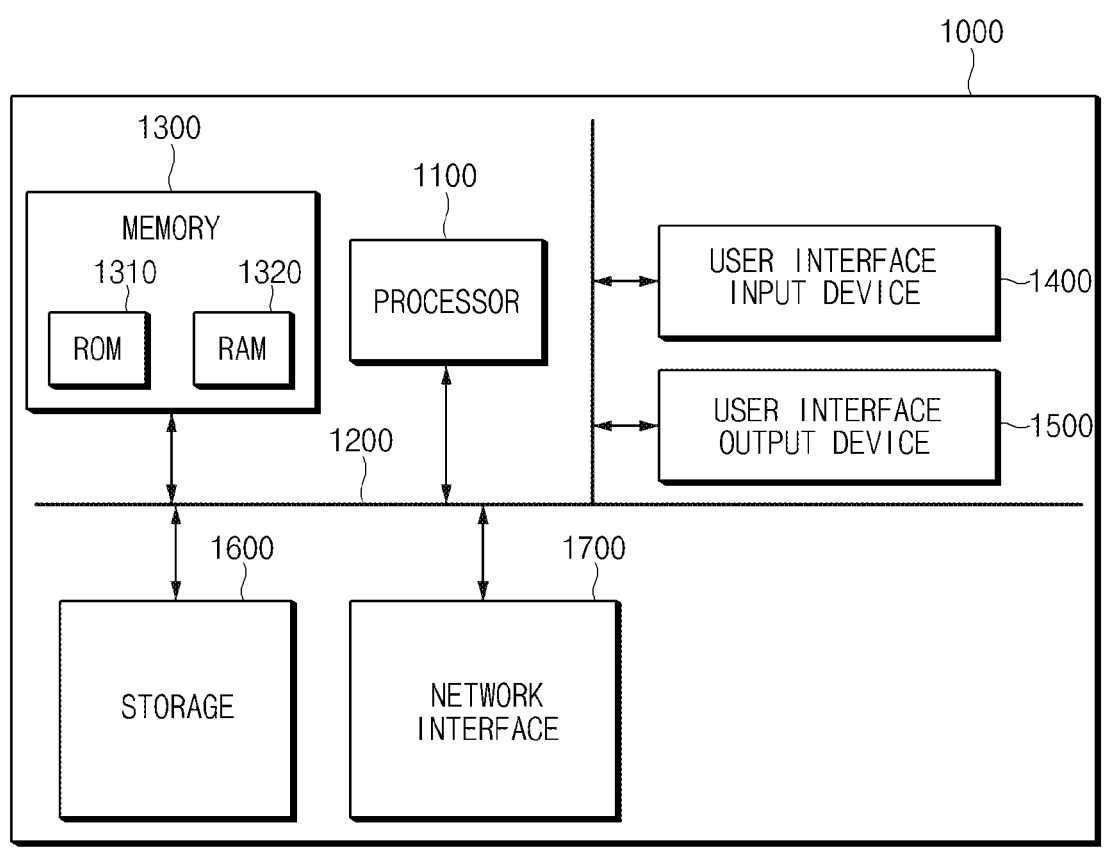
FIG. 11 is a block diagram illustrating a computing system for executing a method of controlling a lane change of an autonomous vehicle according to an embodiment of the present disclosure.

FIG. 11 is a block diagram illustrating a computing system for executing a method of controlling a lane change of an autonomous vehicle according to an embodiment of the present disclosure.

Referring to FIG. 11, as described above, a lane change control method of an autonomous vehicle according to an embodiment of the present disclosure may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus for controlling a lane change of an autonomous vehicle and a method thereof according to an embodiment of the present disclosure may perform deep learning by subdividing various situation information into groups to be considered for safety at a time of the lane change of the autonomous vehicle, and determine whether the lane change of the autonomous vehicle is possible based on the learned result, thereby drastically reducing accidents that may occur during lane changes of autonomous vehicles.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling a lane change of an autonomous vehicle, the apparatus comprising:
   a learning device configured to perform deep learning by subdividing situation information into groups to be considered when the autonomous vehicle changes a lane; and
   a controller configured to control the lane change of the autonomous vehicle based on a learning result of the learning device.

2. The apparatus of claim 1, further comprising:
   an input device configured to input group-specific data on the situation information at a current time point.

3. The apparatus of claim 2, wherein the controller is configured to determine whether the lane change of the autonomous vehicle is possible by applying the data input through the input device to the learning result of the learning device.

4. The apparatus of claim 1, wherein the controller is configured to further consider safety of the autonomous vehicle when determining whether the lane change of the autonomous vehicle is possible.

5. The apparatus of claim 4, wherein the controller is configured to finally determine that the lane change is impossible when a time to collision (TTC) with a preceding vehicle on a lane to be changed does not exceed a threshold value even when a result derived based on the learning result of the learning device indicates that the lane change of the autonomous vehicle is possible.

6. The apparatus of claim 5, wherein the threshold value includes a spare time for safe lane change of the autonomous vehicle.

7. The apparatus of claim 1, wherein the controller is configured to determine whether the lane change of the autonomous vehicle is possible based on a time-to-collision (TTC) without determining whether the lane change of the autonomous vehicle is possible based on the learning result of the learning device when the autonomous vehicle recognizes a congestion situation or a traffic accident, which occurs on a driving lane in front of the autonomous vehicle, at a point spaced apart by a reference distance.

8. The apparatus of claim 2, wherein the input device includes at least one of:
   a first data extractor configured to extract first group data for preventing the autonomous vehicle from colliding with a nearby vehicle when the autonomous vehicle perform the lane change, a second data extractor configured to extract second group data for preventing the autonomous vehicle from colliding with a pedestrian when the autonomous vehicle performs the lane change, a third data extractor configured to extract, as third group data, lighting states of various traffic lights located in front when the autonomous vehicle performs the lane change, a fourth data extractor configured to extract, as fourth group data, a lane changeable area corresponding to a distribution of static objects, a lane changeable area corresponding to a construction section, and a lane changeable area corresponding to an accident section, a fifth data extractor configured to extract a lane changeable area corresponding to a structure of a road as fifth group data, a sixth data extractor configured to extract, as sixth group data, an overlapping area between the lane changeable area extracted by the fourth data extractor and the lane changeable area extracted by the fifth data extractor, or a seventh data extractor configured to extract, as seventh group data, behavior data of the autonomous vehicle when the autonomous vehicle continuously changes lanes, changes lanes in a curvature section, or changes lanes in a state in which a failure code is generated.

9. A method of controlling a lane change of an autonomous vehicle, the method comprising:
performing, by a learning device, deep learning by subdividing situation information into groups to be considered when the autonomous vehicle changes a lane; and
controlling, by a controller, the lane change of the autonomous vehicle based on a learning result of the learning device.

10. The method of claim 9, further comprising:
inputting, by an input device, group-specific data on the situation information at a current time point.

11. The method of claim 10, wherein the controlling of the lane change includes:
determining whether the lane change of the autonomous vehicle is possible by applying the data input through the input device to the learning result of the learning device.

12. The method of claim 9, wherein the controlling of the lane change includes:
further considering safety of the autonomous vehicle when determining whether the lane change of the autonomous vehicle is possible.

13. The method of claim 12, wherein the controlling of the lane change includes:

finally determining that the lane change is impossible when a time to collision (TTC) with a preceding vehicle on a lane to be changed does not exceed a threshold value even when a result derived based on the learning result of the learning device indicates that the lane change of the autonomous vehicle is possible.

14. The method of claim 13, wherein the threshold value includes a spare time for safe lane change of the autonomous vehicle.

15. The method of claim 9, wherein the controlling of the lane change includes:
determining whether the lane change of the autonomous vehicle is possible based on a time-to-collision (TTC) without determining whether the lane change of the autonomous vehicle is possible based on the learning result of the learning device when the autonomous vehicle recognizes a congestion situation or a traffic accident, which occurs on a driving lane in front of the autonomous vehicle, at a point spaced apart by a reference distance.

16. The method of claim 10, wherein the inputting of the group-specific data includes:
extracting first group data for preventing the autonomous vehicle from colliding with a nearby vehicle when the autonomous vehicle perform the lane change;
extracting second group data for preventing the autonomous vehicle from colliding with a pedestrian when the autonomous vehicle performs the lane change;
extracting, as third group data, lighting states of various traffic lights located in front when the autonomous vehicle performs the lane change;
extracting, as fourth group data, a lane changeable area corresponding to a distribution of static objects, a lane changeable area corresponding to a construction section, and a lane changeable area corresponding to an accident section;
extracting a lane changeable area corresponding to a structure of a road as fifth group data;
extracting, as sixth group data, an overlapping area between the lane changeable area of the fourth group data and the lane changeable area of the fifth group data; or
extracting, as seventh group data, behavior data of the autonomous vehicle when the autonomous vehicle continuously changes lanes, changes lanes in a curvature section, or changes lanes in a state in which a failure code is generated.

* * * * *